Figure 6A:
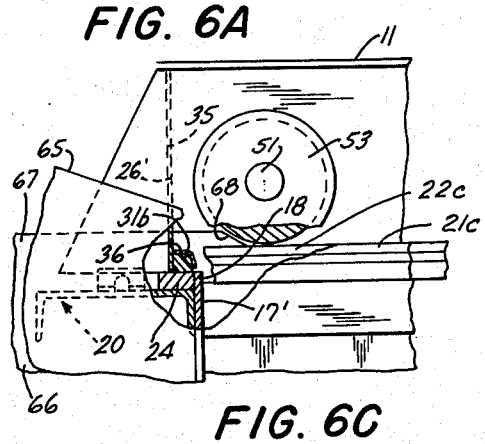
Figure 6B:
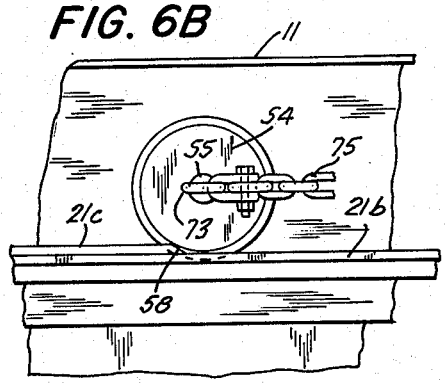

May 18, 1965  C. R. BARLOW  3,183,874
HATCH COVER ASSEMBLY
Filed Feb. 19, 1962  4 Sheets-Sheet 1
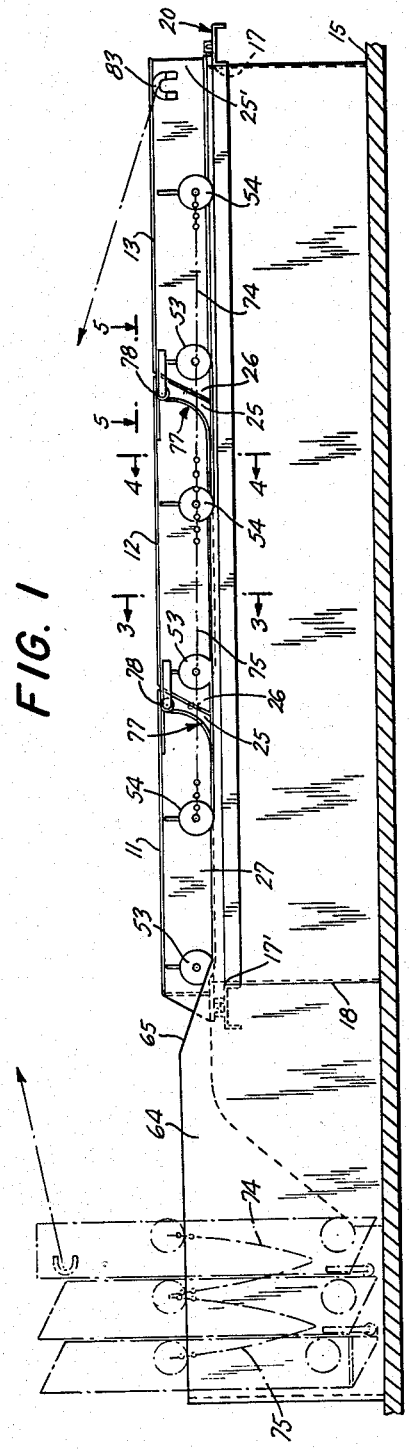
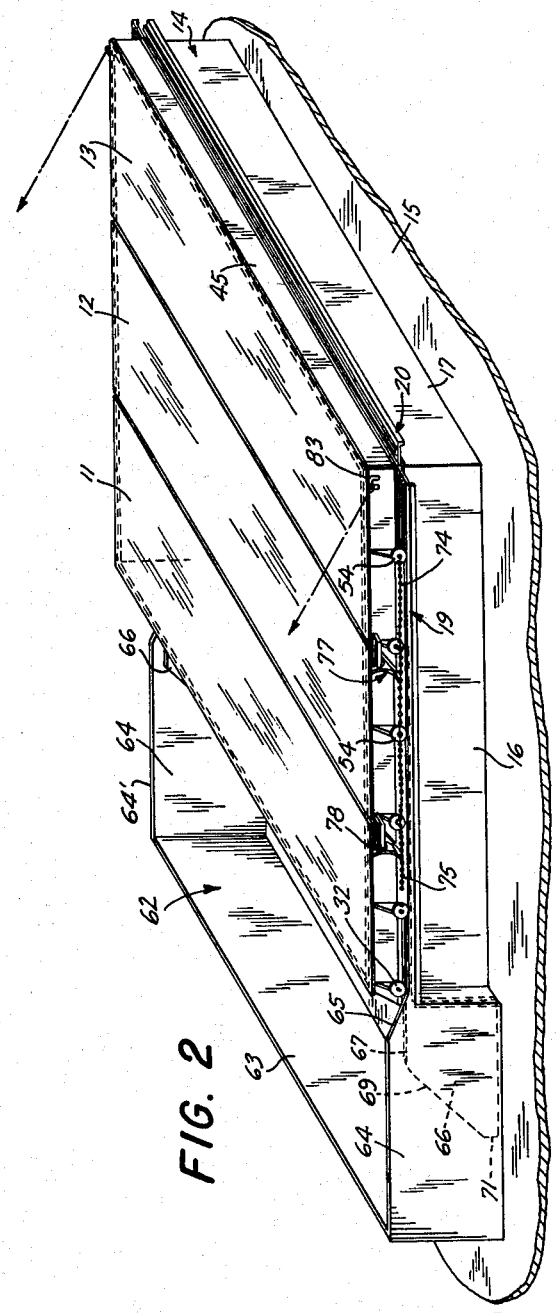
INVENTOR.
CECIL R. BARLOW
BY
Dean, Fairbank & Hirsch
ATTORNEYS

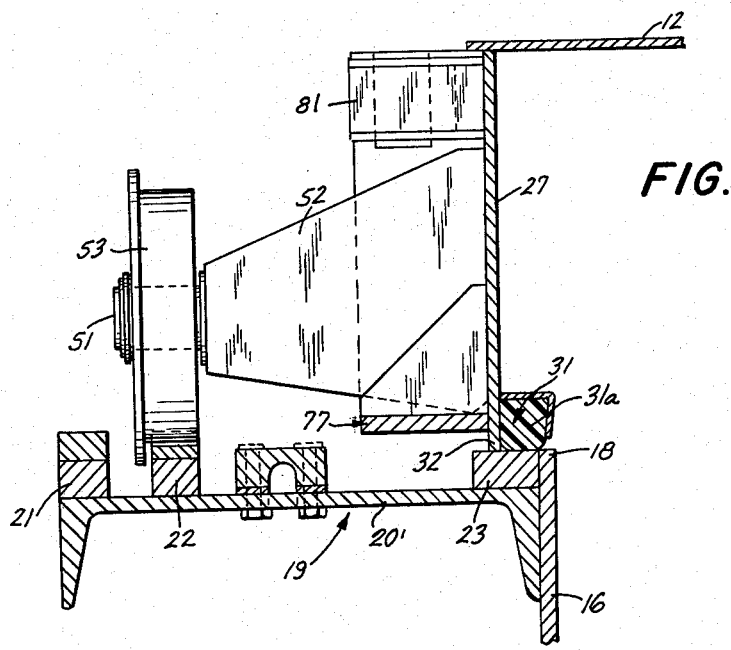
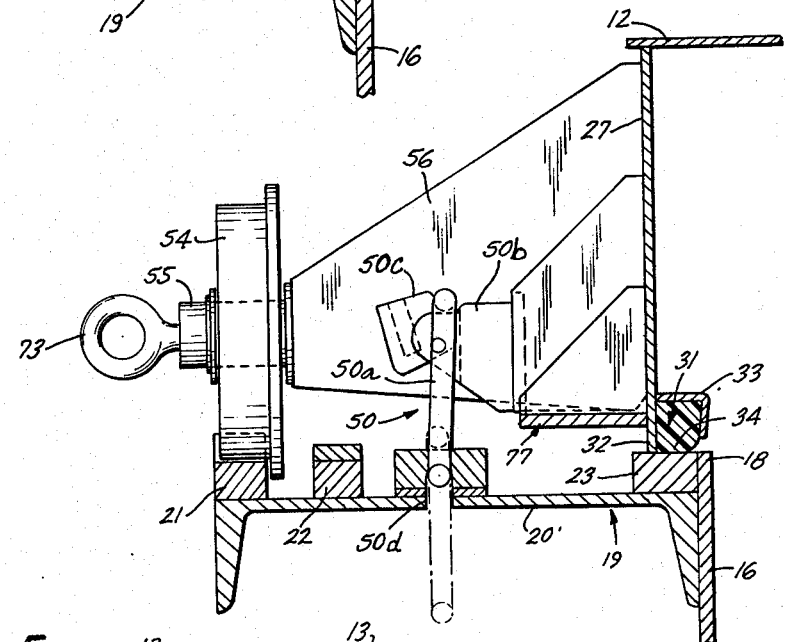
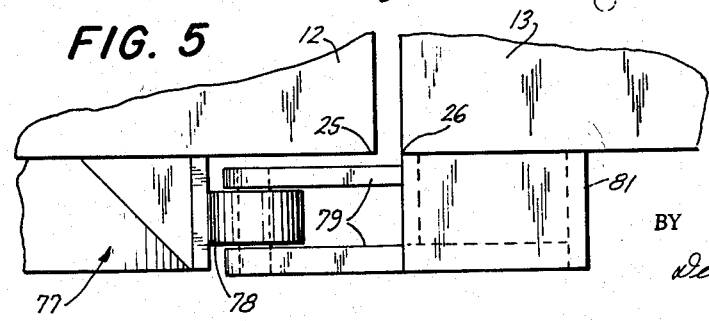

May 18, 1965  C. R. BARLOW  3,183,874
HATCH COVER ASSEMBLY
Filed Feb. 19, 1962  4 Sheets-Sheet 3

INVENTOR.
CECIL R. BARLOW
BY
Dean, Fairbank & Hirsch
ATTORNEYS

May 18, 1965
C. R. BARLOW
3,183,874
HATCH COVER ASSEMBLY
Filed Feb. 19, 1962
4 Sheets-Sheet 4
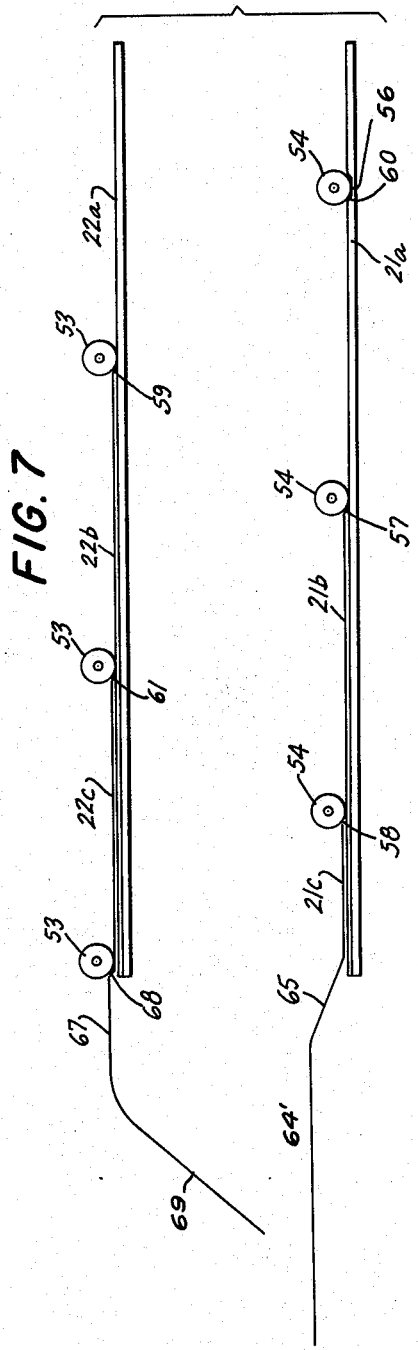
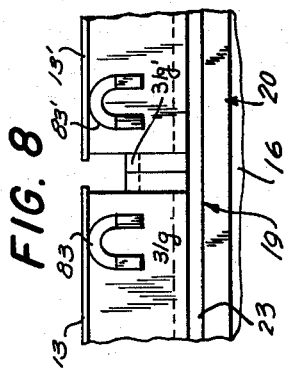
INVENTOR.
CECIL R. BARLOW
BY
*Dean, Fairbank & Hirsch*
ATTORNEYS United States Patent Office 3,183,874
Patented May 18, 1965

3,183,874
HATCH COVER ASSEMBLY
Cecil R. Barlow, Roslyn, N.Y., assignor to Fuller Company, Catasauqua, Pa., a corporation of Delaware
Filed Feb. 19, 1962, Ser. No. 173,999
6 Claims. (Cl. 114—202)

As conducive to an understanding of the invention it is noted that where a plurality of substantially rectangular, interconnected hatch cover panels, carry rollers at each end which ride along tracks on each side of the hatchway, so that the panels may be moved between horizontal closed position in side by side relation over the hatchway, to vertical stowed position at one end of the hatchway clear of the latter by pulling the panel remote from the stowage position toward and away from the latter, if the panels should skew during the course of their movement, the rollers thereof may become displaced from the tracks with resultant malfunctioning of the installation.

Where the individual panels are interconnected by rigid links pivoted to adjacent panels to prevent skewing of any one of the panels with respect to the other during movement of said panels, due to the multiplicity of pivotal connections, severe alignment problems are present, so that precise tolerances are necessary in the fabrication of such panels which would add greatly to the cost thereof. In addition, even with such precise tolerances, in the event of freezing of any one of said plurality of pivotal connections say, due to improper lubrication, the resultant failure of the associated link to pivot properly would cause skewing of the associated panels and malfunctioning of the installation.

It is accordingly among the objects of the invention to provide a hatch cover installation of the above type, which, with a minimum of rollers carrying the panels, will permit movement of the panels from side by side horizontal closed position over the hatchway, to vertical position clear of the hatchway when in fully open stowed position, which panels will provide a complete watertight seal with respect to the hatchway when in closed position, yet may readily be moved to open stowed position without injury to the gaskets effecting such seal and with a single power source employed to move the panels between closed and stowed position and which panels have only a flexible interconnection therebetween devoid of pivotal joints, yet will dependably be retained in alignment so that no skewing thereof will occur as the panels are moved between closed and open position.

According to the invention, these objects are accomplished by the arrangement and combination of elements hereinafter described and more particularly recited in the claims.

Figure 1:
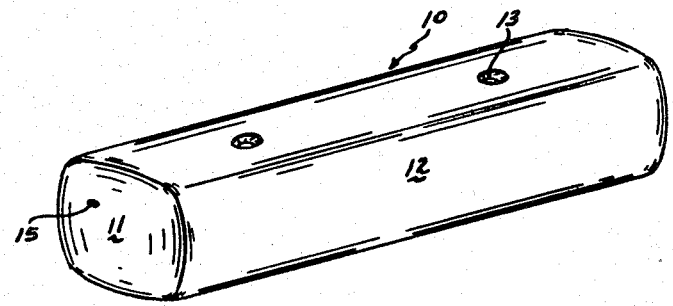
Figure 2:
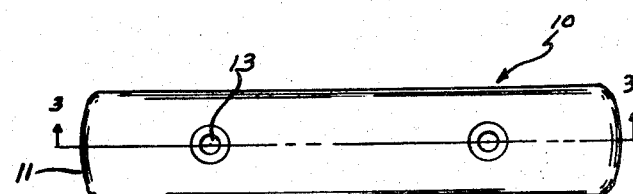
Figure 3:
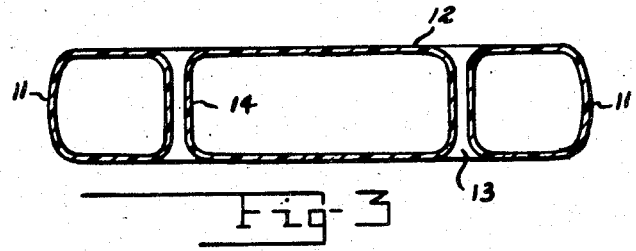
Figure 5:
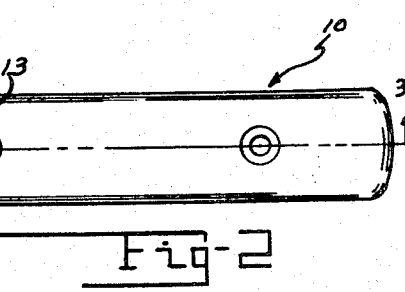
Figure 4:
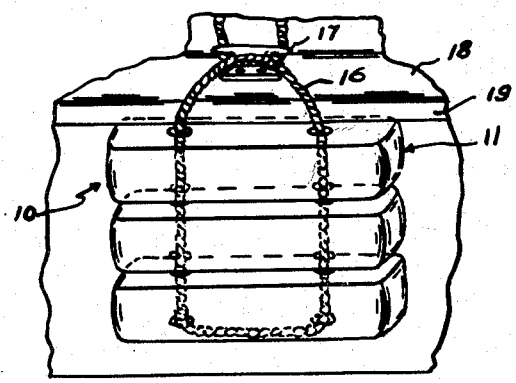

In the accompanying drawings in which are shown one or more of various possible embodiments of the several features of the invention, FIG. 1 is a side elevational view of the installation,
FIG. 2 is a perspective thereof,
FIG. 3 is a sectional view taken along line 3—3 of FIG. 1,
FIG. 4 is a sectional view taken along line 4—4 of FIG. 1,
FIG. 5 is a sectional view taken along line 5—5 of FIG. 1,
FIGS. 6A to 6G are fragmentary detail side elevational views of the installation with parts broken away,
FIG. 7 is a diagrammatic view showing the seal breaking mechanism, and
FIG. 8 is a fragmentary view illustrating an installation having two sets of panels.

Referring now to the drawings, as shown in FIG. 1, the hatch cover installation comprises a plurality of individual, substantially rectangular hatch cover panels 11, 12 and 13, designed to be positioned in side by side relation in a horizontal plane when in closed position so as to extend transversely across a coaming 14 which rises from the deck 15 of a ship around the hatchway thereof.

Extending laterally outward from the sides 16 and ends 17, 17' of the coaming 14, as shown in FIGS. 2 and 3, adjacent the upper edge 18 thereof are substantially U-shaped channel members 19 and 20, each of which extends substantially the length of the associated side and end of the coaming, the plane of the cross piece 20' of the channel members being slightly below the upper edge 18 of the coaming.

Each of the channel members 19 has a rail 21 secured to its top surface adjacent its outer edge and extending the length thereof, said rail 21 hereafter being called the outboard rail. In addition, a rail 22, hereafter called the inboard rail, is also secured to the top surface of each channel member 19 and extends the length thereof, said rails 22 being positioned inwardly of the outboard rails.

Each of the channel members 19 also has a sealing bar 23, substantially rectangular in cross section, extending along the length thereof adjacent the outer surface of the side walls 16 of the coaming 14, said sealing bars 23 having their top surface substantially flush with the upper edge 18 of the coaming as is clearly shown in FIGS. 3 and 4.

Figure 6C:
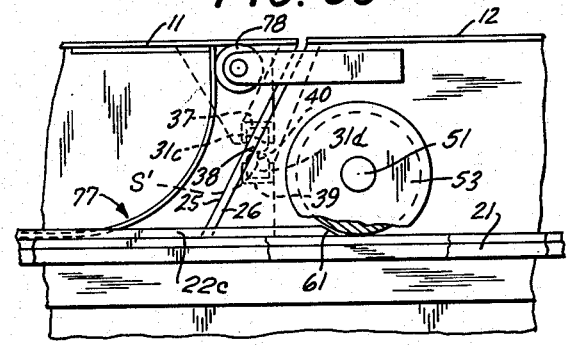
Figure 6D:
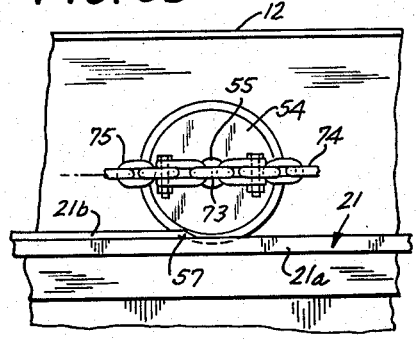
Figure 6E:
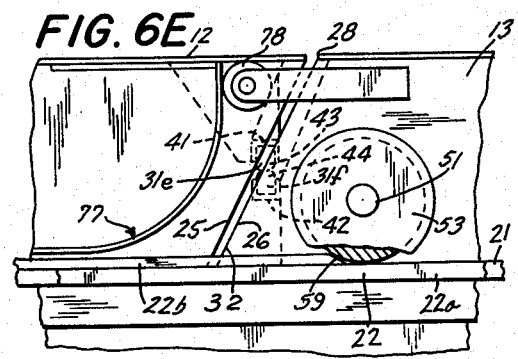
Figure 6F:
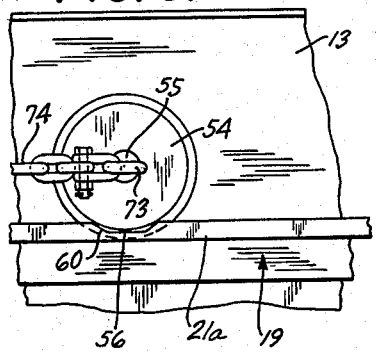
Figure 6G:
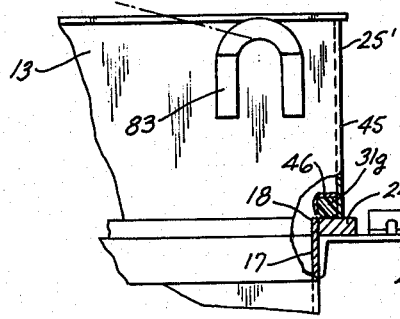

In addition, as is clearly shown in FIGS. 6A and 6G, a sealing bar 24 also substantially rectangular in cross section, extends the length of each of the channel members 20 at the ends of the coaming, said sealing bar 24 also having its top surface substantially flush with the upper edge 18 of the coaming.

The adjacent inner edges 25, 26 of the end walls or skirts 27 of the adjacent pairs of panels 11, 12 and 12, 13 respectively, are complementarily inclined as shown to facilitate pivotal movement of the panels in the manner hereinafter to be described. Thus, such edges 25, 26 are inclined toward the end wall 17' of the coaming from the upper edge 28 of the end wall of the panels to the lower edge 32 thereof.

Each of the panels 11, 12 and 13 has an associated gasket 31 to provide a watertight seal with respect to the sealing bars 23, 24. As is clearly shown in FIGS. 3 and 4, the gasket 31 associated with panels 11, 12 and 13 has a portion 31a extending along each of the lower edges 32 of the end walls 27 of said panels on the inner surfaces of said end walls, said portions 31a of the gaskets being retained in position by an L-shaped retainer bracket 33 secured to the inner surfaces of said end walls. The gaskets are so positioned that their lower surfaces 34, when the gaskets are not compressed, will extend slightly below the lower edges 32 of such end walls 27.

As is clearly shown in FIG. 6A, the side wall or skirt 35 of panel 11 extends slightly beyond the upper edge 18 of the end 17' of the coaming and a portion 31b of the gasket 31 extends along the inner surface of side wall 35 of panel 11 at its lower edge being secured in place by an L-shaped retainer bracket 36.

The gasket 31 of panel 11 also has a portion which rises up its inclined edge 25 and then extends the length of the panel below its upper edge as at 31c as is clearly shown in FIG. 6C, being retained in place by a U-shaped retainer bracket 37 so that the portion 31c will extend vertically downward with its lower surface 38 extending into the junction between edges 25, 26.

The gasket 31 of panel 12 has a portion 31d (FIG. 6C) which rises upwardly along the edge 26 of panel 12 and extends the length of said panel 12 below its upper edge, being retained in place by a U-shaped retainer bracket 39 identical to the retainer bracket 37 of panel 11. The portion 31d of gasket 31 extends upwardly substantially vertically and its surface 40 when uncomclined downwardly, and a portion of the outermost track of each pair extending along said stowage area to serve as a pivot support for said other roller, whereby as the first rollers of each panel preceding the next adjacent panel successively ride down said inclined portions and the other pivot rollers of each panel ride along said pivot portions, said panels will successively be pivoted about said other rollers to hang in substantially vertical position in said stowage area, complementary guiding means and reaction means rigid respectively with the ends of adjacent panels near the adjacent edges thereof, said guiding means comprising a rigid member secured to each of the ends of the associated panel adjacent the edge thereof nearest the stowage area and extending substantially parallel to such panel ends, the free ends of said rigid members straddling the ends of the preceding panel and being slightly spaced therefrom, said reaction means comprising a strip secured to each of the ends of each of said preceding panels and against which the free ends of said rigid members are adapted to abut, whereby when force is exerted against the panel most remote from the stowage area to move it toward the latter, the free ends of the rigid members will abut against the reaction strips of the preceding panel to move the latter toward the stowage area without skewing thereof, and flexible means connecting adjacent panels, said flexible means being taut when said panels are in closed position and slack when in stowed position.

2. The combination set forth in claim 1 in which each of said panels has a rectangular top surface and substantially rectangular end walls depending therefrom, said reaction means comprises an elongated strip extending laterally outward and downwardly from each end wall from substantially the upper edge thereof, said strip being curved toward the edge of said panel adjacent said stowage area, and then extending along said lower edge, said curved strips, when the free ends of the rigid members abut thereagainst, moving relative to the ends of the rigid members as said panels mounting said strips are pivoted to stowed position, for continuous engagement of said strips and rigid members through a substantial portion of such pivotal movement.

3. The combination set forth in claim 1 in which each of said panels has a rectangular top surface and substantially rectangular end walls depending therefrom, a sealing bar extends along each side of said hatchway parallel to said tracks, the lower edge of said end walls, when said panels are in closed position, resting on said sealing bars with said rollers being slightly spaced from said tracks, said tracks having a plurality of inclined ramp portions on the side of each roller respectively adjacent the stowage area, up which the rollers are adapted to ride when the panels are initially moved in a horizontal plane from closed position to stowed position, each of said rollers being slightly spaced from the associated ramp when the panels are in closed horizontal position, whereby the entire weight of the panels will be supported by the sealing bars and when the panels are initially moved from closed position to stowed position, the rollers will ride up the associated ramp to lift the panels to move the lower edges of the end walls away from the sealing bars.

4. The combination set forth in claim 3 in which the outer edge of each of the outermost panels of said plurality has a substantially rectangular side wall depending therefrom, a sealing bar extends across each end of the hatchway, the lower edges of said side walls, when said panels are in closed position, resting on said sealing bars, a resilient gasket extends around the periphery of each panel, a portion of each of the gaskets extending along the lower edges of each of the end and side walls and abutting against said sealing bars to define seals, said gaskets having portions extending along the inner edges of adjacent panels, adapted to abut to define seals when said panels are in side by side substantially horizontal position, whereby when the panels are lifted, the portions of the gaskets abutting against the sealing bars will be moved away therefrom to break the associated seal.

5. The combination set forth in claim 4 in which the abutting portion of the gasket on the preceding panel is in a horizontal plane above that of the abutting portion of the gasket of the next succeeding panel, whereby when said preceding panel is pivoted, its abuttting portion will move in an arcuate path away from the associated abutting portion, said flexible means when taut retaining said abutting portions in engagement.

6. The combination set forth in claim 3 in which a second set of substantially rectangular panels are also provided identical to said first set, both of said sets of panels being adapted to be positioned in side by side relation in substantially a horizontal plane over said hatchway when in closed position, a second stowage area is provided at the other end of the hatchway identical to the first stowage area, said tracks having a plurality of inclined ramp portions on the side of each roller respectively of the respective sets adjacent the associated stowage area, the outer edge of the panel of each set adjacent the associated stowage area having a substantially rectangular side wall depending therefrom, a sealing bar extending across each end of the hatchway, the lower edges of said side walls when said panels are in closed position resting on said sealing bars, a resilient gasket extending around the periphery of each panel, a portion of each of the gaskets extending along the lower edges of each of the end and side walls and abutting against said sealing bars to define seals, said gaskets having portions extending along the inner edges of adjacent panels of each set, and along the adjacent edges of the inner-most panels of said two sets, adapted to abut respectively to define seals when said panels are in side by side substantially horizontal position.

References Cited by the Examiner

UNITED STATES PATENTS

| 2,753,827 | 7/56 | Sabin | 114—201 |
| 2,771,136 | 11/56 | Lecomte | 114—202 |
| 2,780,197 | 2/57 | Von Tell | 114—202 |
| 2,923,266 | 2/60 | Mercier | 114—201 |
| 2,946,304 | 7/60 | Greere et al. | 114—202 |

FOREIGN PATENTS 804,228   7/57   Great Britain.

MILTON BUCHLER, *Primary Examiner.*

ANDERW H. FARRELL, *Examiner.*

May 18, 1965 L. E. RUSSELL 3,183,875
BUMPER
Filed Dec. 9, 1963

INVENTOR.
LINUS E. RUSSELL
BY Tom Walker
Jerome P. Bloom
ATTORNEYS